(12) United States Patent
Murakami

(10) Patent No.: US 7,044,878 B2
(45) Date of Patent: May 16, 2006

(54) DIFFERENTIAL ROTATION CONTROL APPARATUS FOR VEHICLE

(75) Inventor: Mamoru Murakami, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 71 days.

(21) Appl. No.: 10/740,810

(22) Filed: Dec. 22, 2003

(65) Prior Publication Data

US 2004/0140144 A1 Jul. 22, 2004

(30) Foreign Application Priority Data

Dec. 26, 2002 (JP) ............................ P. 2002-376461
Dec. 26, 2002 (JP) ............................ P. 2002-376462
Dec. 26, 2002 (JP) ............................ P. 2002-376463

(51) Int. Cl.
*B60K 23/04* (2006.01)

(52) U.S. Cl. ...................................................... 475/84

(58) Field of Classification Search ................. 475/84, 475/89, 22, 23, 27, 231; 180/6.3, 76
See application file for complete search history.

(56) References Cited

U.S. PATENT DOCUMENTS

| | | | |
|---|---|---|---|
| 3,027,987 A * | 4/1962 | Fisher | 475/84 |
| 3,461,744 A * | 8/1969 | Booth | 475/23 |
| 4,331,208 A * | 5/1982 | Kolthoff et al. | 475/23 |
| 4,505,168 A * | 3/1985 | Booth et al. | 475/23 |
| 4,973,294 A * | 11/1990 | Kobari et al. | 475/84 |
| 6,520,880 B1 * | 2/2003 | Fukushima et al. | 475/84 |

FOREIGN PATENT DOCUMENTS

| | | | |
|---|---|---|---|
| DE | 3638232 A1 | 5/1988 | |
| DE | 39 26 487 A1 | 4/1990 | |
| DE | 40 22 839 A1 | 1/1992 | |
| DE | 296 18 866 U1 | 1/1997 | |
| DE | 201 03 129 U1 | 5/2001 | |
| EP | 267419 * | 5/1988 | ................. 475/89 |
| EP | 0 318 688 A1 | 6/1989 | |
| GB | 897 850 | 5/1962 | |
| GB | 897850 * | 5/1962 | |
| GB | 2 135 256 A | 8/1984 | |
| GB | 2 224 790 * | 5/1990 | ................. 180/76 |
| JP | 61268530 * | 11/1986 | ................. 180/76 |
| JP | 4-19237 | 1/1992 | |

(Continued)

OTHER PUBLICATIONS

European Search Report dated May 5, 2004.

(Continued)

*Primary Examiner*—Sherry Estremsky
(74) *Attorney, Agent, or Firm*—McGinn IP Law Group, PLLC

(57) ABSTRACT

A differential rotation control apparatus for a vehicle having a differential, left and right output shafts of the differential, and left and right axle shafts, comprises variable displacement type left and right hydraulic pumps driveably provided between the left and right output shafts and the left and right axle shafts, a first hydraulic passage interposed between a discharge port of the left hydraulic pump and a suction port of the right hydraulic pump, a second hydraulic passage interposed between a discharge port of the right hydraulic pump and a suction port of the left hydraulic pump, and a controller for calculating a displacement ratio between the left and right hydraulic pumps based on a target turning radius and for controlling a rotation speed ratio between the left and right axle shafts so as to coincide with the calculated displacement ratio.

17 Claims, 13 Drawing Sheets

FOREIGN PATENT DOCUMENTS

| | | |
|---|---|---|
| JP | 2641724 | 5/1997 |
| JP | 2826580 | 9/1998 |
| JP | 2001-74125 | 3/2001 |
| SU | 1 058 805 A | 12/1983 |

OTHER PUBLICATIONS

European Search Report dated Sep. 27, 2004.
European Search Report dated May 20, 2005.

* cited by examiner

US 7,044,878 B2

DIFFERENTIAL ROTATION CONTROL APPARATUS FOR VEHICLE

BACKGROUND OF THE INVENTION

1. Field of the Invention

The present invention relates to a differential rotation control apparatus and more particularly to a differential rotation control apparatus capable of controlling a wheel rotation speed ratio between left and right wheels with simple control logics over a wide driving range.

2. Discussion of Related Arts

Various ideas of torque distribution control apparatuses between left and right wheels for vehicles have been produced and put into practical use. As a typical type of those apparatuses, there is an apparatus incorporating a coupling (a hydraulic multiple disc clutch is widely used) for variably controlling torque distribution between left and right wheels.

The apparatuses like these are disclosed for example in Japanese Patent Applications 2641724, 2826580 and the like. These apparatuses incorporates gear sets for forcedly differentiating left and right shafts by a hydraulic multiple disc clutch so as to regulate a torque flow from left to right wheels and vise versa besides a mechanical type differential for transmitting power from a power source to left and right wheels.

However, the differential rotation control apparatuses disclosed in the patent applications 2641724, 2826580 have a disadvantage that the upper limit of the controllable rotation speed ratio between left and right wheels is dependent upon gear ratios of the gear sets and therefore the control range of the differential rotation control apparatuses is limited by their mechanical construction. Further, those prior arts need a complicated feedback control with respect to an increase or decrease of torque in order to maintain the rotation speed ratio between left and right wheels at the target rotation speed ratio.

SUMMARY OF THE INVENTION

It is a primary object of the present invention to provide a differential rotation control apparatus capable of controlling a rotation speed ratio between left and right wheels in a stable manner over a wide range. Further, it is another object of the present invention to provide a differential rotation control apparatus having no interference with a braking control of an antilock braking system (ABS) when the ABS operates.

In order to attain the objects, the differential rotation control apparatus for a vehicle having a left axle shaft, a right axle shaft, a differential including a left output shaft and a right output shaft for distributing a driving force from a power source to the left and right output shafts, comprises a left hydraulic pump driveably provided between the left output shaft and the left axle shaft, a right hydraulic pump driveably provided between the right output shaft and the right axle shaft, a first hydraulic passage for connecting a suction port of the left hydraulic pump with a discharge port of the right hydraulic pump, a second hydraulic passage for connecting a suction port of the right hydraulic pump with a discharge port of the left hydraulic pump, variable displacement means for varying a displacement of at least one of the left and right hydraulic pumps so as to equalize an actual rotation speed ratio between the left and right axle shafts to a rotation speed ratio between the left and right axle shafts determined based on a turning radius of the vehicle.

Further, with respect to a vehicle having an antilock braking system (ABS), the differential rotation control apparatus further comprises a bypass passage interposed between the first and second hydraulic passages and an opening and closing valve provided in the bypass passage. When the ABS is operative, the opening and closing valve is opened to prevent the apparatus from being interfered with the operation of the ABS.

DETAILED DESCRIPTION OF THE PREFERRED EMBODIMENTS

Figure 1:
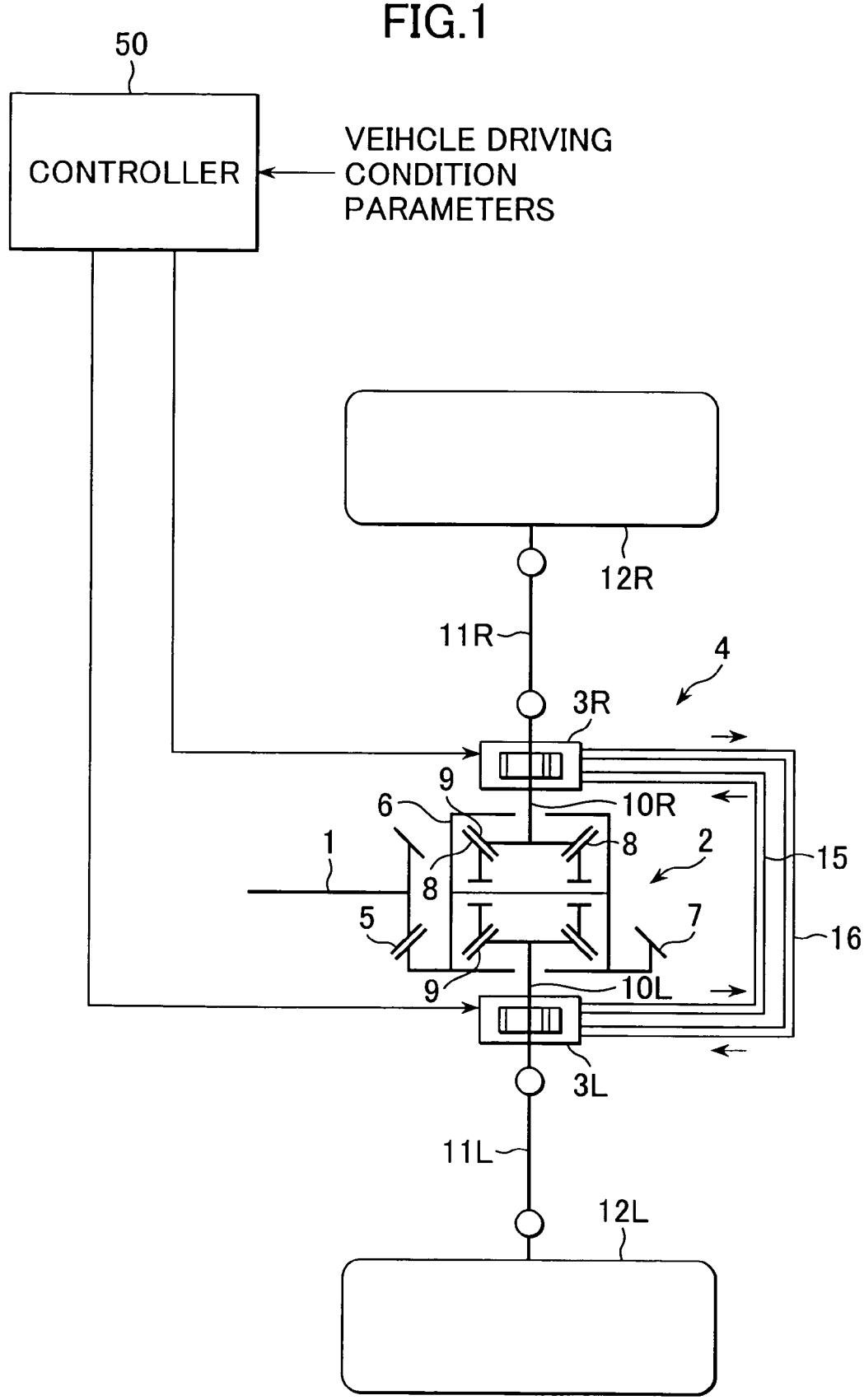
FIG. 1 is a schematic skeleton diagram of a differential rotation control apparatus according to a first embodiment of the present invention.

A differential rotation control apparatus according to the present invention has a capability of transmitting torque to left and right wheels at a discretionary distribution ratio by controlling a rotation speed ratio between left and right wheels using two hydraulic pumps (motors) provided in the respective wheels. Referring to FIG. 1, reference numeral 1 denotes a drive shaft for transmitting driving force transmitted from an engine (not shown) through a transmission (not shown). The drive shaft 1 is connected with a differential 2 to which a differential rotation control apparatus 4 is attached. Further, the differential rotation control apparatus 4 includes left and right hydraulic pumps 3L, 3R.

The differential 2 comprises a drive pinion 5 connected with an end portion of the drive shaft 1, a crown gear 7 fixed to the outside of a differential case 6 and meshing with the drive pinion 5, pinions 8, 8 rotatably supported by the differential case 6 and meshing with side gears 9, 9. The side gears 9, 9 are rigidly connected with left and right output shafts 10L, 10R extending left and right through the differential case 6, respectively.

The left and right output shafts 10L, 10R are connected with drive shafts of the hydraulic pumps 3L, 3R, respectively. Further, the output shafts 10L, 10R are connected with axle shafts 11L, 11R through the drive shafts of the pumps 3L, 3R, respectively. Further, the axle shafts 11L, 11R are secured at the ends thereof to left and right drive wheels 12L, 12R, respectively.

The left and right hydraulic pumps 3L, 3R are of vane pumps and at least one of them is a variable displacement type pump. The both pumps 3L, 3R are connected with each other through hydraulic passages 15, 16, constituting a closed circuit. That is, a discharge port of the left hydraulic pump 3L communicates with an suction port of the right hydraulic pump 3R through the hydraulic passage 15 and a discharge port of the right hydraulic pump 3R communicates with an suction port of the left hydraulic pump 3L through the hydraulic passage 16.

Figure 8:
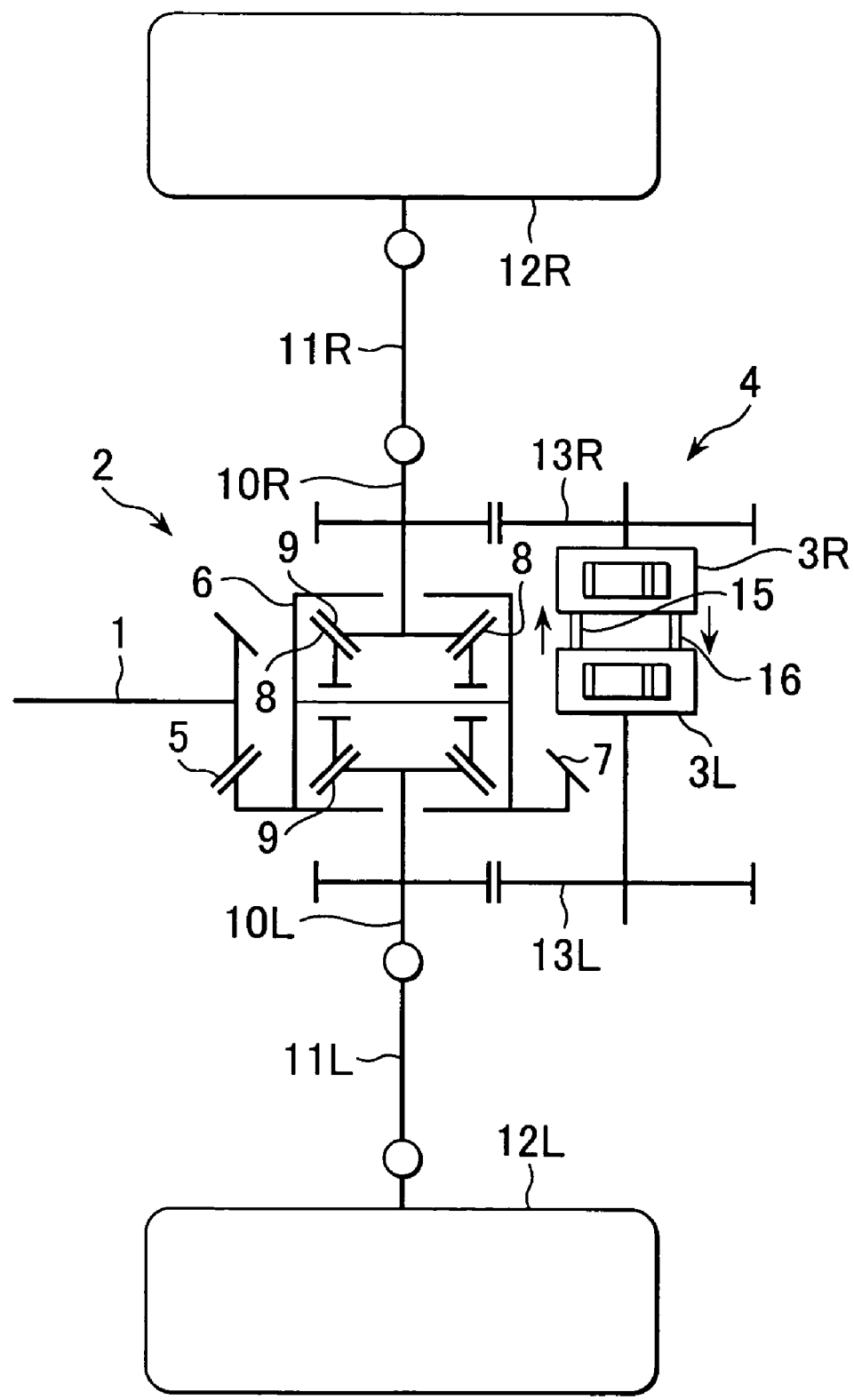
FIG. 8 is a schematic skeleton diagram showing one example of the arrangement of a differential, left and right hydraulic pumps and first and second hydraulic passages.

In this embodiment, the left and right hydraulic pumps 3L, 3R are directly connected with the left and right axle shafts 11L, 11R in series, respectively, however these pumps may be connected with the left and right axle shafts through gear sets 13L, 13R secured to the respective output shafts 10L, 10R, chains and the like in parallel, as shown in FIG. 8. Thus gathering the hydraulic pumps 3L, 3R at one place brings advantages such as reduced lengths of the hydraulic passages 15, 16, increased efficiency, enhanced reliability, and better maintenanceability.

Figure 9:
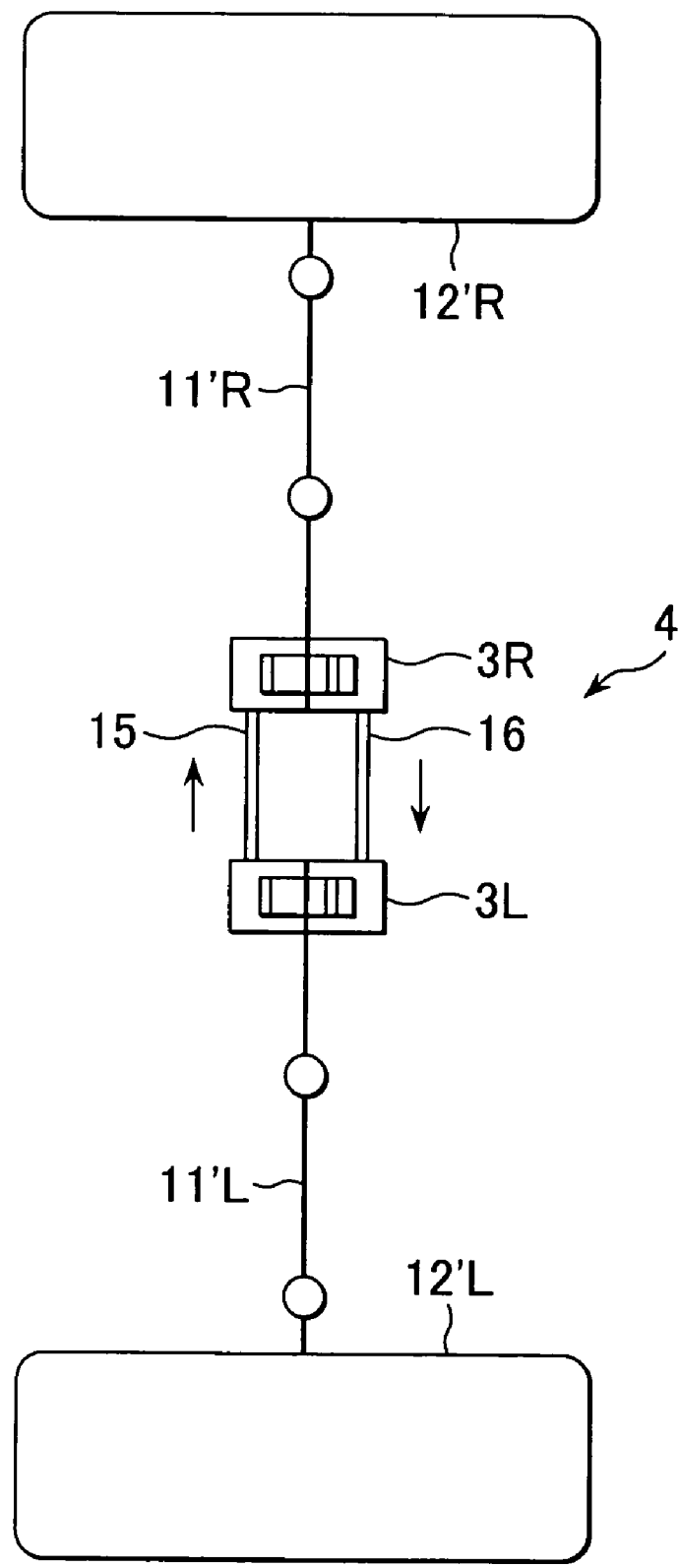
FIG. 9 is a schematic diagram showing a differential rotation control apparatus applied to driven wheels.

Further, FIG. 1 shows an example of the differential rotation control apparatus applied to driving wheels and FIG. 9 shows an example of the differential rotation control apparatus applied to driven wheels. As illustrated in FIG. 9, in case where the apparatus is employed in the driven wheels, the drive shafts of the hydraulic pumps 3L, 3R are connected with the axle shafts 11'L, 11'R of driven wheels 12'L, 12'R and the differential 2 is not used in this construction.

Figure 2:
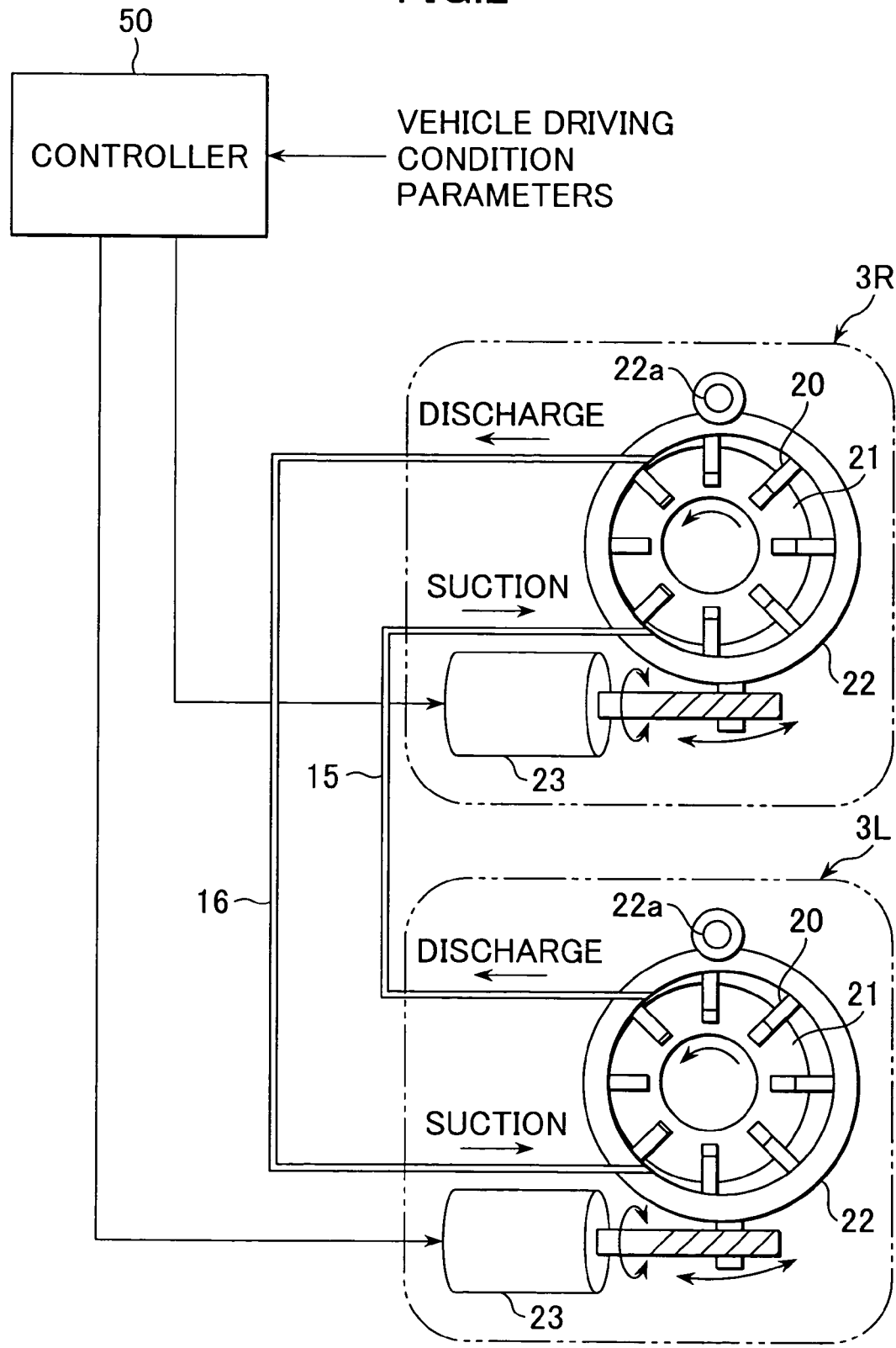
FIG. 2 is an explanatory diagram showing a variable displacement hydraulic pump according to the first embodiment.

Describing the construction of the hydraulic pump 3L (or 3R) by reference to FIG. 2, the hydraulic pump 3L is a variable displacement type hydraulic pump which comprises a rotor 21 having vanes 20 and rotating in a circular cam ring 22. The rotational center of the cam ring 22 is off set with respect to the rotational center of the rotor 21 and the offset amount is varied by an actuator 23. In this embodiment, the offset amount is varied by converting the rotational movement of the actuator 23 into the swing movement around a supporting point 22a of the cam ring 22 and as a result the displacement volume per revolution (referred to as just displacement, hereinafter) of the pump is varied.

The actuators 23, 23 of the left and right hydraulic pump 3L, 3R are connected with a controller 50 constituted by a micro-computer and the like and are controlled by signals from the controller 50. The controller 50 inputs miscellaneous parameters representing vehicle operating conditions such as a steering angle, wheel speeds of front and rear wheels, an accelerator opening angle, an engine speed, a longitudinal acceleration, a lateral acceleration and the like.

The controller 50 establishes a control target value (target rotation speed ratio) of rotation speed ratio between left and right wheels based on the above parameters and controls the displacement of the pump through the actuators 23, 23 so as to agree with the target rotation speed ratio.

That is, since the hydraulic pumps 3L, 3R rotate at the same speed as the wheels, the discharge amounts of the pumps 3L, 3R are expressed as follows respectively.

$$QL = VL \times NL \quad (1)$$

$$QR = VR \times NR \quad (2)$$

where QL is the amount of discharge of the left pump 3L; VL is a displacement per one rotation of the left pump 3L; NL is a rotation speed of the left wheel; QR is the amount of dischrge of the right pump 3R; VR is a displacement per one rotation of the left pump 3R; and NR is a rotation speed of the right wheel.

Since the left and right hydraulic pumps 3L, 3R form a closed hydraulic circuit with the hydraulic passages 15, 16, the amount of discharge of the left and right hydraulic pumps 3L, 3R are identical (QL=QR).

Accordingly, the following formula is obtained from the above formulas (1), (2).

$$VL \times NL = VR \times NR \quad (3)$$

Figure 3:
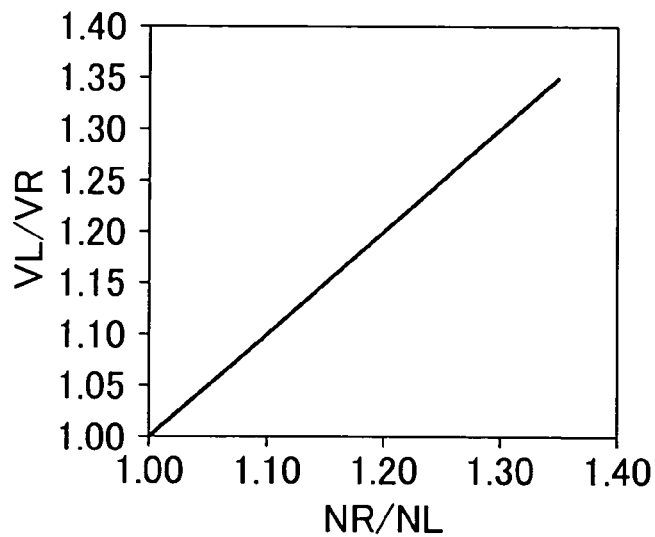
FIG. 3 is a graph showing a relationship between a rotation speed ratio between left and right wheels and a displacement ratio between left and right hydraulic pumps.

Transforming the formula (3), the rotation speed ratio between left and right NR/NL is obtained. As shown in FIG. 3, the displacement ratio between left and right pumps VL/VR has a linear relationship with the rotation speed ratio between left and right wheels NR/NL.

$$NR/NL = VL/VR \quad (3')$$

Accordingly, when the displacement of one of the left and right hydraulic pumps is increased by a given ratio, the other hydraulic pump acting as a hydraulic motor, the rotation speed of the other wheel can be increased at the same ratio. That is, by means of varying the displacement of the pumps, when the rotation speed of the one axle shaft (11L) is decreased, the rotation speed of the other axle shaft (11R) is increased. Further, the differential 2 allows the both axle shafts to make a relative rotation. The driving force transmitted from the drive shaft 1 can be distributed to the left and right axle shafts 11L, 11R at a discretionary distribution ratio according to the increasing or decreasing ratio of the rotation speed of the axle shaft.

As described before, one of the left and right hydraulic pumps 3L, 3R may be a variable displacement type and the other may be a fixed displacement type. However, in case where both left and right hydraulic pumps are of a variable displacement type, the control range and the applicability of the apparatus increase as much and it is desirable that both hydraulic pumps 3L, 3R are of a variable displacement type.

Figure 4:
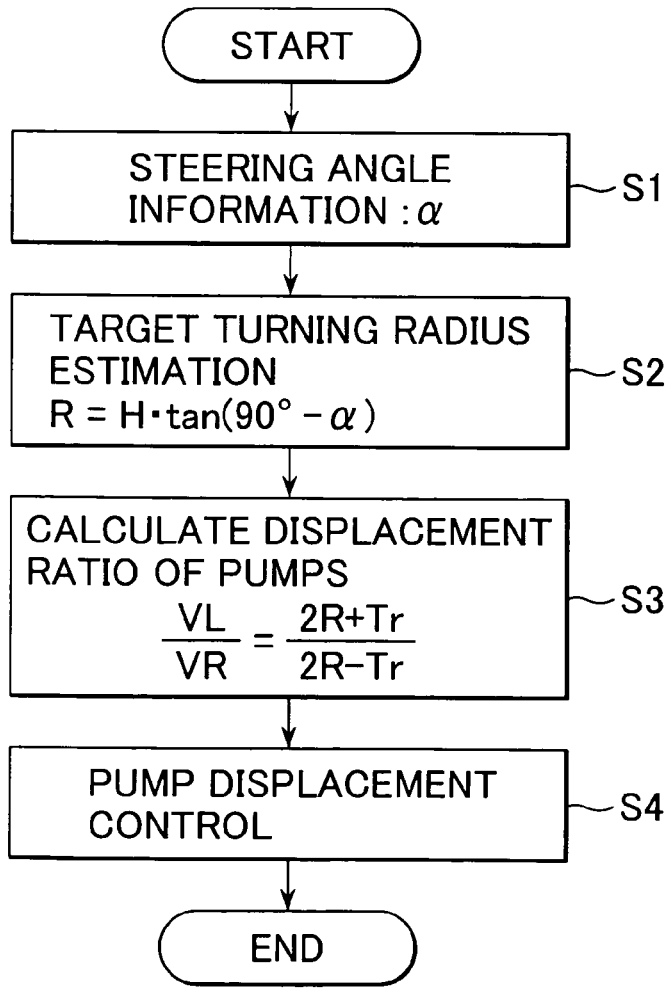
FIG. 4 is a flowchart showing processes of controlling the left and right hydraulic pumps by a controller according to a first embodiment.

Below, the control processes of the hydraulic pumps 3L, 3R will be described by referring to a flowchart shown in FIG. 4. In this embodiment, the hydraulic pumps are attached to the rear axle shafts, however in case where those hydraulic pumps may be attached to the front axle shafts, the fundamental logics are identical except for small modifications to the formulas.

Figure 5:
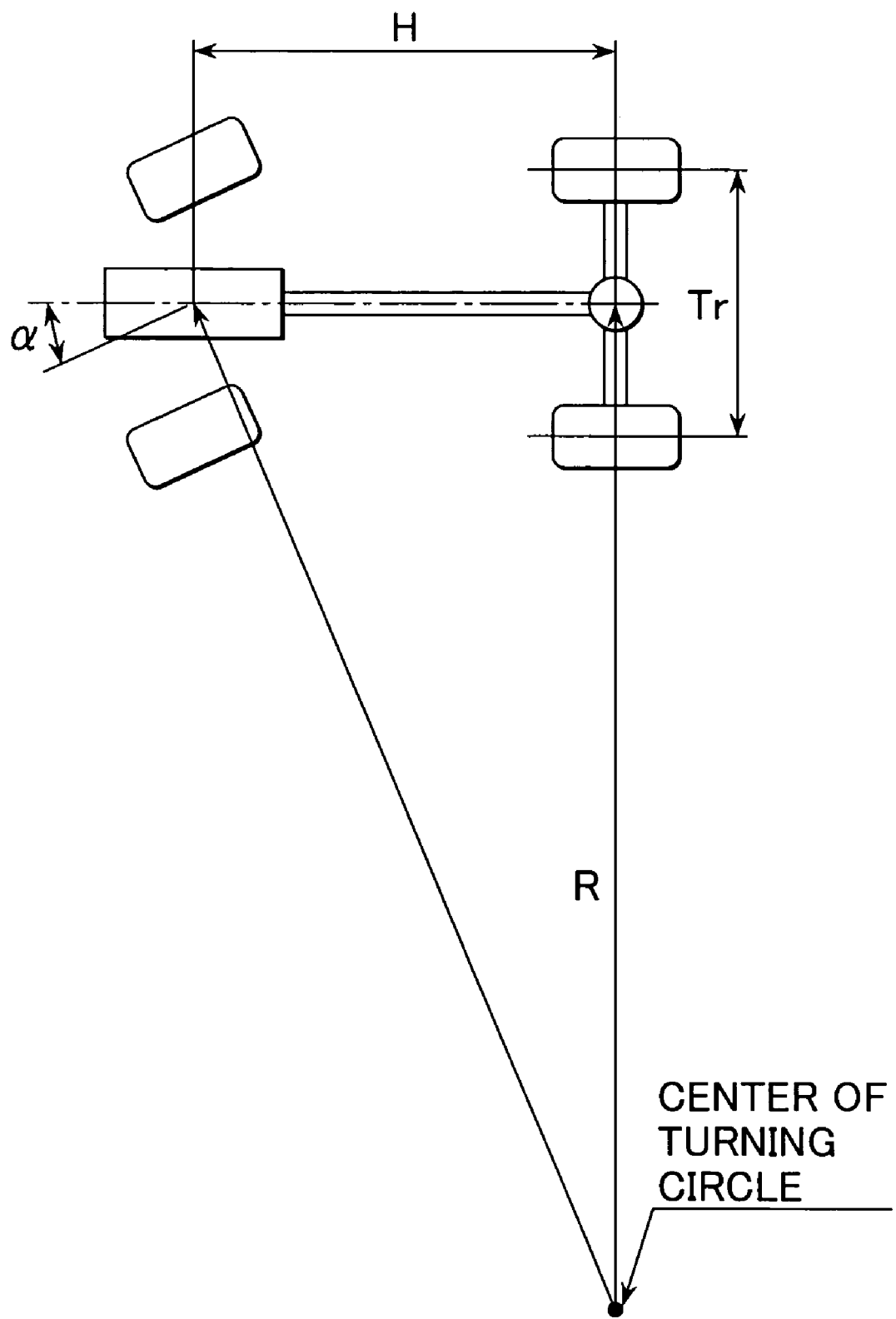
FIG. 5 is a diagram showing a geometrical relationship between a steering angle, a tread, a wheel base and a turning radius.
Figure 6:
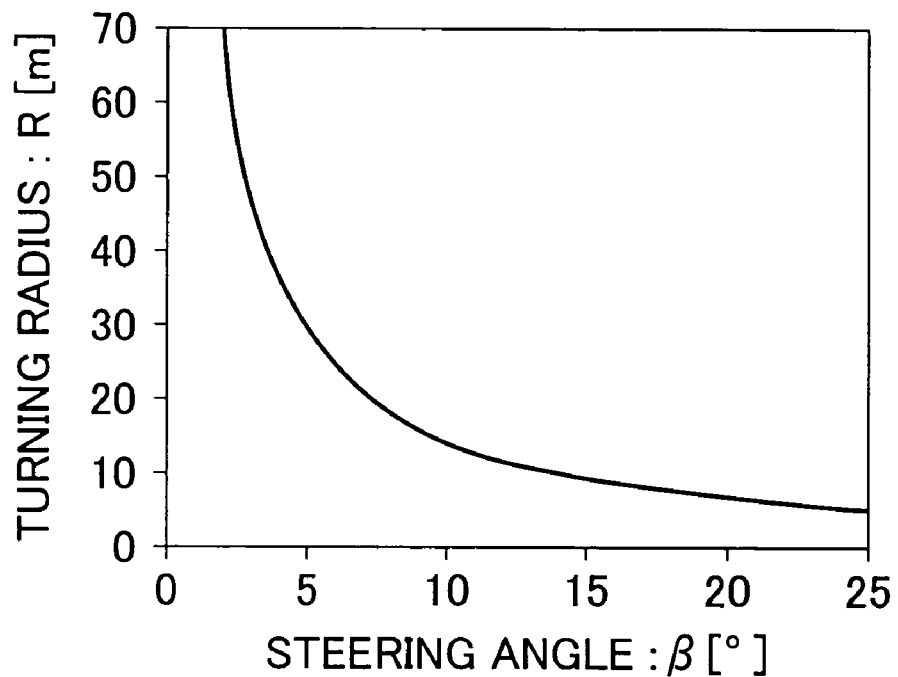
FIG. 6 is a graph showing a relationship between a steering angle and a turning radius.
Figure 7:
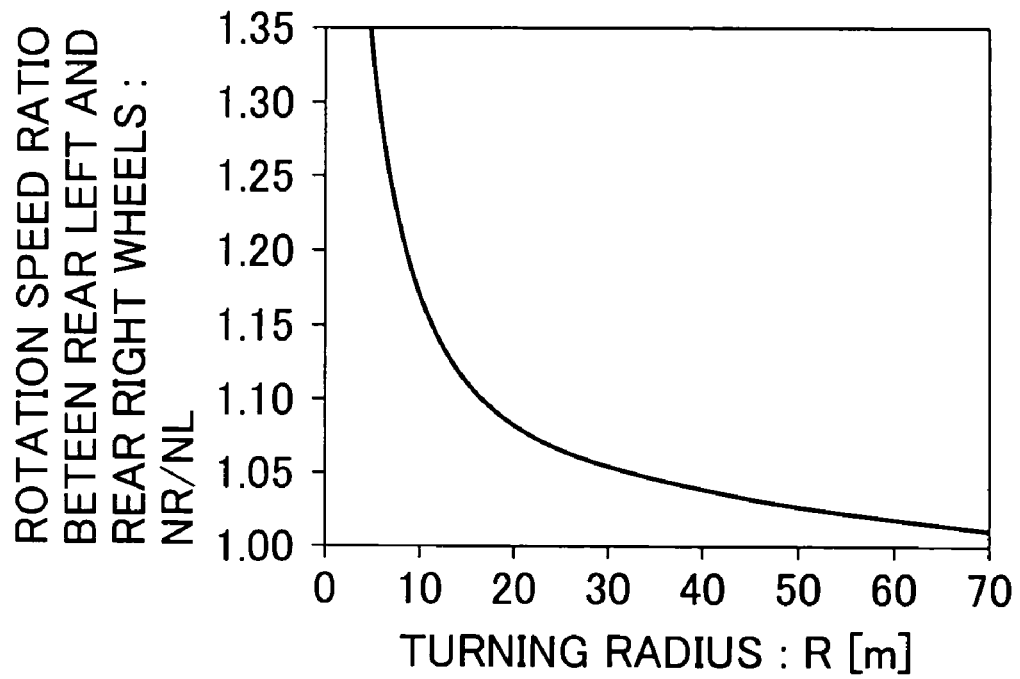
FIG. 7 is a graph showing a relationship between a turning radius and a rotation speed ratio between rear left and rear right wheels.

First, at a step S1 a present steering angle α is obtained based on steering angle information from a steering angle sensor and the like. Next, the program goes to a step S2 where a target turning radius R is estimated from the steering angle α and the wheel base H. The target turning radius R can be obtained according to the following formula (4) based on a geometrical relationship shown in FIG. 5.

$$R = H \times \tan(90^\circ - \alpha) \quad (4)$$

Then, at a step S3, the displacement ratio between left and right pumps VL/VR is calculated based on the target turning radius R and the rotation speed ratio between left and right wheels DN. The rotation speed ratio between left and right wheels DN is obtained from the following formula (5):

$$DN = (2R+Tr)/(2R-Tr) \quad (5)$$

where Tr is a tread between left and right wheels.

On the other hand, since the rotation speed ratio between left and right wheels DN is equal to the rotation speed ratio between left and right pumps, the rotation speed ratio between left and right wheels DN can be expressed as the following formula (6) using the aforesaid formula (3').

$$DN = NR/NL = VL/VR \text{ (or } DN = NL/NR = VR/VL) \quad (6)$$

Hence, using the formulas (5) and (6), we obtain, $$VL/VR \text{ (or } VR/VL) = (2R+Tr)/(2R-Tr) \quad (7)$$

Then, after the displacement ratio between left and right pumps VL/VR (or VL/VR) is calculated, the program goes to a step S4 where the displacement of the respective pumps is varied by the respective actuators 23, 23 of the left and right hydraulic pumps 3L, 3R according to drive signals from the controller 50 and the calculated displacement ratio VL/VR (or VR/VL) is maintained.

Thus, when the wheels travel without slippage, the flow of working fluid between the left and right hydraulic pumps 3L, 3R are balanced according to these control logics and the target turning radius can be maintained. Further, when the wheels cause slippage and as a result, the vehicle comes out of the target turning circle, a righting moment is exerted on the vehicle so as to prevent wheel slippage.

For example, when the front wheels cause a slippage during left turn and the vehicle makes a larger curve than expected (understeer), the hydraulic pressure of the hydraulic passage 15 connecting the discharge port of the hydraulic pump 3L of the rear left wheel and the suction port of the hydraulic pump 3R rises due to the deviation of the rotation speed ratio from the target rotation speed ratio and as a result a torque on the rear right wheel side increases and a torque on the rear left side decreases. As a result, a yaw moment for turning the vehicle to left generates between the rear left and rear right wheels to prevent the vehicle from going out of the turning radius. As a result, the wheels are prevented from slippage and the traveling stability is enhanced.

Further, in case where the vehicle attempts to start in a condition of a right driving wheel riding on a frozen road surface, it is difficult to go forward due to a slippage of the right driving wheel only with the normal differential 2. In this case, the differential rotation control apparatus 4 according to the present invention can easily realize a differential lock condition in which the rotation speed of the left wheel agrees with that of the right wheel by controlling so that the respective displacements of the left and right hydraulic pumps 3L, 3R are identical.

In this differential lock condition, when the right driving wheel is causing a slippage, the pressure of the hydraulic passage 16 connecting the discharge port of the right hydraulic pump 3R with the suction port of the left hydraulic pump 3L increases and as a result the rotation of the right wheel is braked. Concurrently, the left hydraulic pump 3L serving as a hydraulic motor, generates a torque to increase the rotation speed of the left driving wheel. This operation prevents a slippage of the right driving wheel and as a result the torque generated in the left driving wheel enables to start the vehicle smoothly.

Thus, since the displacements of the hydraulic pumps are designed so as to be variable, the rotation speed ratio between left and right wheels can be controlled to a discretionary value. Further, since, in case where the actual rotation speed ratio deviates from the target rotation speed ratio, the torque generated from the hydraulic pressure is automatically applied to the wheels in a direction nearing the target rotation speed ratio.

According to the prior art in which the torque is a control object, like a differential rotation control apparatus using a hydraulic clutch and gears, a feedback control of the torque itself is necessary in order to control the rotation speeds of the left and right wheels to a target rotation speed. However, the differential rotation speed control apparatus 4 according to the present invention needs no feedback control and therefore a stable traveling control having a wide control range can be realized with very simple control logics.

Further, according to the present invention, since differential rotation energy streams from the pump whose rotation speed decreases to the pump whose rotation speed increases, compared to the prior art using a hydraulic clutch and gears, an energy loss in changing the rotation speed ratio can be reduced and a mechanical efficiency of the apparatus can be enhanced.

Next, a second embodiment of the present invention will be described by referring to FIG. 10.

Generally, there is a possibility that when the displacements of the hydraulic pumps 3L, 3R are suddenly changed, the hydraulic pressure of the hydraulic passages goes up or goes down abruptly to generate cavitations inside of the hydraulic pumps. The second embodiment is related to a protection circuit against the sudden change of hydraulic pressure in the hydraulic passages.

Figure 10:
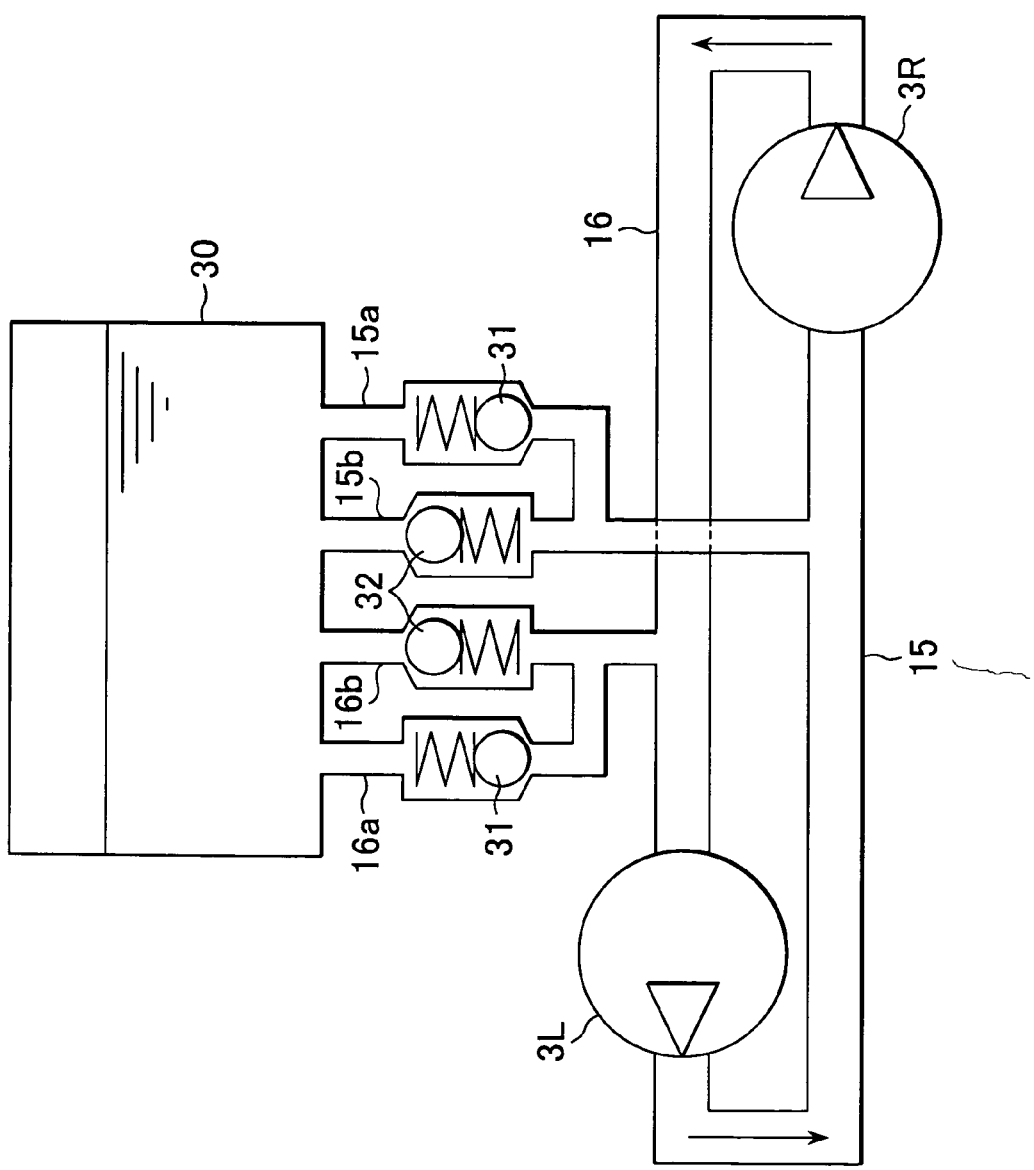
FIG. 10 is a schematic diagram showing a differential rotation control apparatus having a protection circuit according to a second embodiment of the present invention.

Referring to FIG. 10, the hydraulic passage 15 connecting the discharge port of the left hydraulic pump 3L with the suction port of the right hydraulic pump 3R is connected with a reserve tank 30 through two relief passages 15a, 15b disposed in parallel with each other. The one relief passage 15a is provided with a pressure regulator valve 31 for opening when the pressure of the hydraulic passage 15 exceeds a predetermined value and the other relief passage 15b is provided with a charge valve 32 for opening when the pressure of the hydraulic passage 15 goes down below the predetermined value.

Similarly, the hydraulic passage 16 connecting the discharge port of the right hydraulic pump 3R with the suction port of the left hydraulic pump 3L is connected with a reserve tank 30 through two relief passages 16a, 16b disposed in parallel with each other. The one relief passage 16a is provided with a pressure regulator valve 31 for opening when the pressure of the hydraulic passage 16 exceeds a predetermined value and the other relief passage 16b is provided with a charge valve 32 for opening when the pressure of the hydraulic passage 16 goes down below a predetermined value.

When the displacement of the pump changes suddenly, the pressure of the one hydraulic passage becomes high and the pressure of the other hydraulic passage becomes negative. Then, the pressure regulator valve 31 on the high pressure side opens to release the pressure to the reserve tank 30 and the charge valve 32 opens to introduce working fluid from the reserve tank 30. As a result, the pressure of the hydraulic passages 15, 16 can be maintained within a proper pressure range preventing cavitations.

Figure 11:
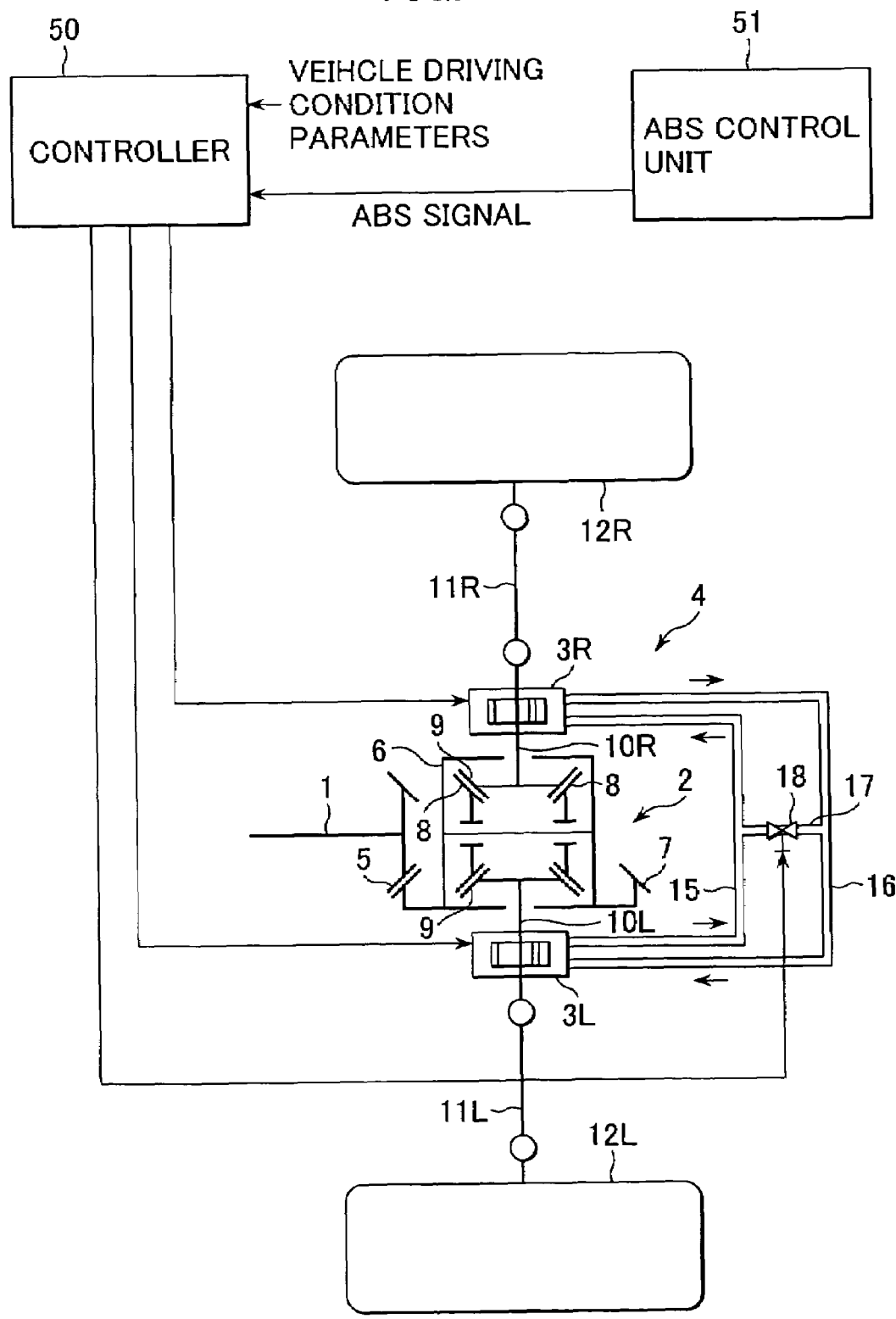
FIG. 11 is a schematic skeleton diagram of a differential rotation control apparatus according to a third embodiment of the present invention.

Next, a third embodiment of the present invention will be described by reference to FIGS. 11 and 12. The third embodiment relates to a differential rotation control apparatus capable of avoiding an interference with an antilock braking system.

The hydraulic passage 15 is connected with the hydraulic passage 16 through a bypass passage 17 and an opening and closing valve 18 is interposed in the bypass passage 17. The opening and closing valve 18 is normally closed. As will be described hereinafter, when an antilock braking system (hereinafter referred to as ABS) operates, the opening and closing valve 18 opens to equalize the pressure in the hydraulic passages 15, 16 and to enable the free rotations of the left and right hydraulic pumps 3L, 3R. As a result, the differential rotation control apparatus 4 can be prevented from disturbing the braking control of the ABS.

Figure 12:
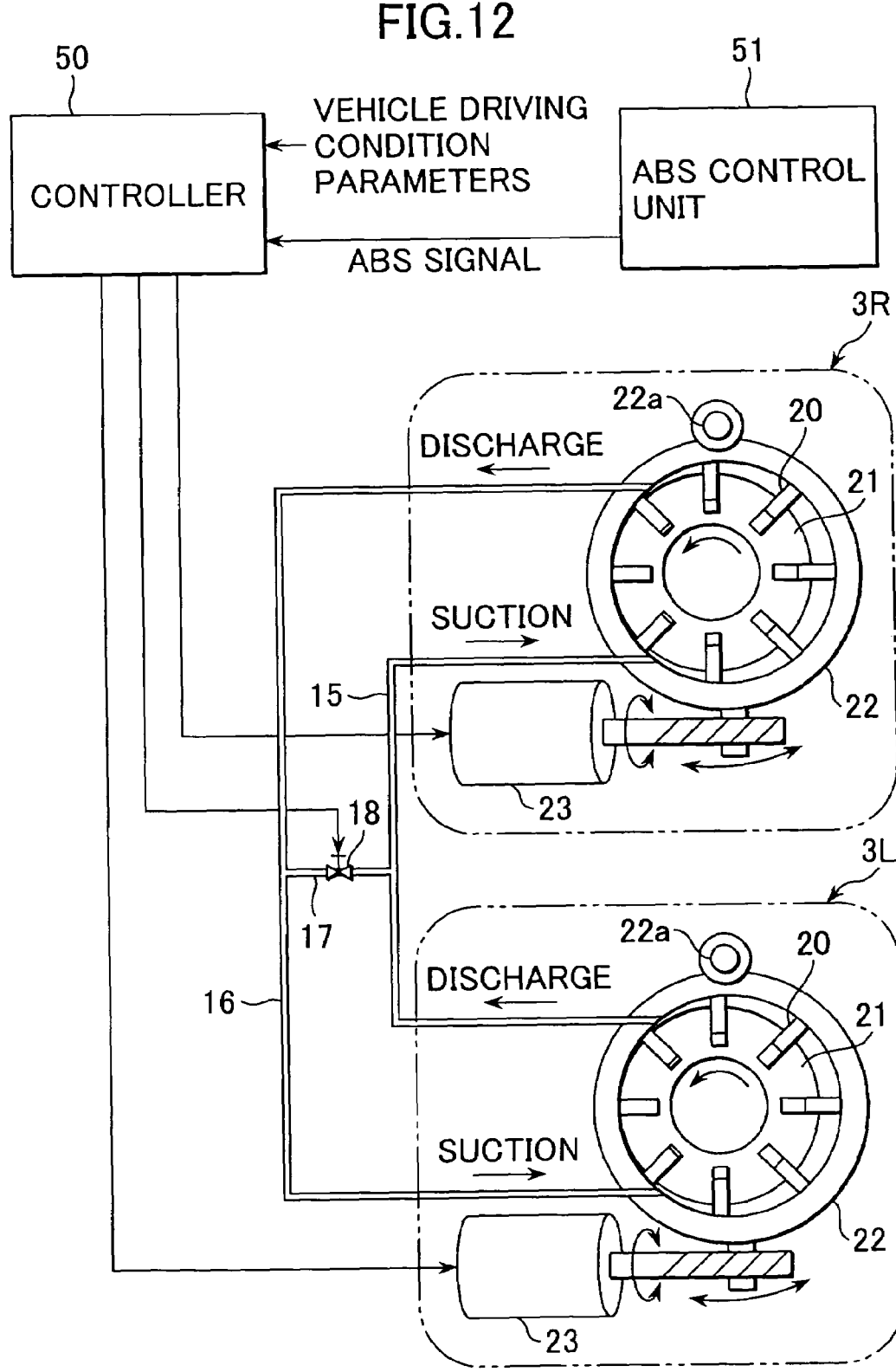
FIG. 12 is an explanatory diagram showing a variable displacement hydraulic pump according to a third embodiment.

As shown in FIG. 12, the actuators 23, 23 of the left and right hydraulic pumps 3L, 3R and the opening and closing valve 18 are connected with the controller 50 and those are driven, opened or closed by signals from the controller 50. The controller 50 is connected with an ABS control unit 51 for controlling the braking operation of an ABS (not shown) of the vehicle. The ABS is for preventing wheel locks when sudden braking or braking on slippery roads. When an ABS signal indicative of the operative ABS is outputted from the ABS control unit 51 to the controller 50, the controller 50 inputs miscellaneous parameters presenting vehicle driving conditions, such as steering angles, wheel speeds of front and rear wheels, accelerator angles, engine speeds, longitudinal accelerations, lateral accelerations and the like.

When there is no ABS signal outputted from the ABS control unit 51 (ABS is inoperative), the controller 50 controls the left and right hydraulic pumps 3L, 3R in such a manner that the rotation speed ratio between left and right wheels agrees with the target rotation speed ratio with the opening and closing valve 18 closed.

On the other hand, when the ABS signal is outputted from the ABS control unit 51 (ABS is operative), the controller 50 opens the opening and closing valve 18. As a result, the pressure of the hydraulic passage 15 is equalized to that of the hydraulic passage 16 and the pressure difference between the discharge port and the suction port of the respective hydraulic pumps 3L, 3R becomes zero. As a result, the left and right hydraulic pumps 3L, 3R rotate freely and the interference with the braking operation of the ABS can be completely prevented. Then, when the ABS is inoperative, after the displacements of the left and right hydraulic pumps 3L, 3R are newly established to target values respectively, the controller 50 makes closing processes of the opening and closing valve 18 while the shock following the closing operation of the bypass passage 17 being alleviated and goes to the normal control.

Figure 13:
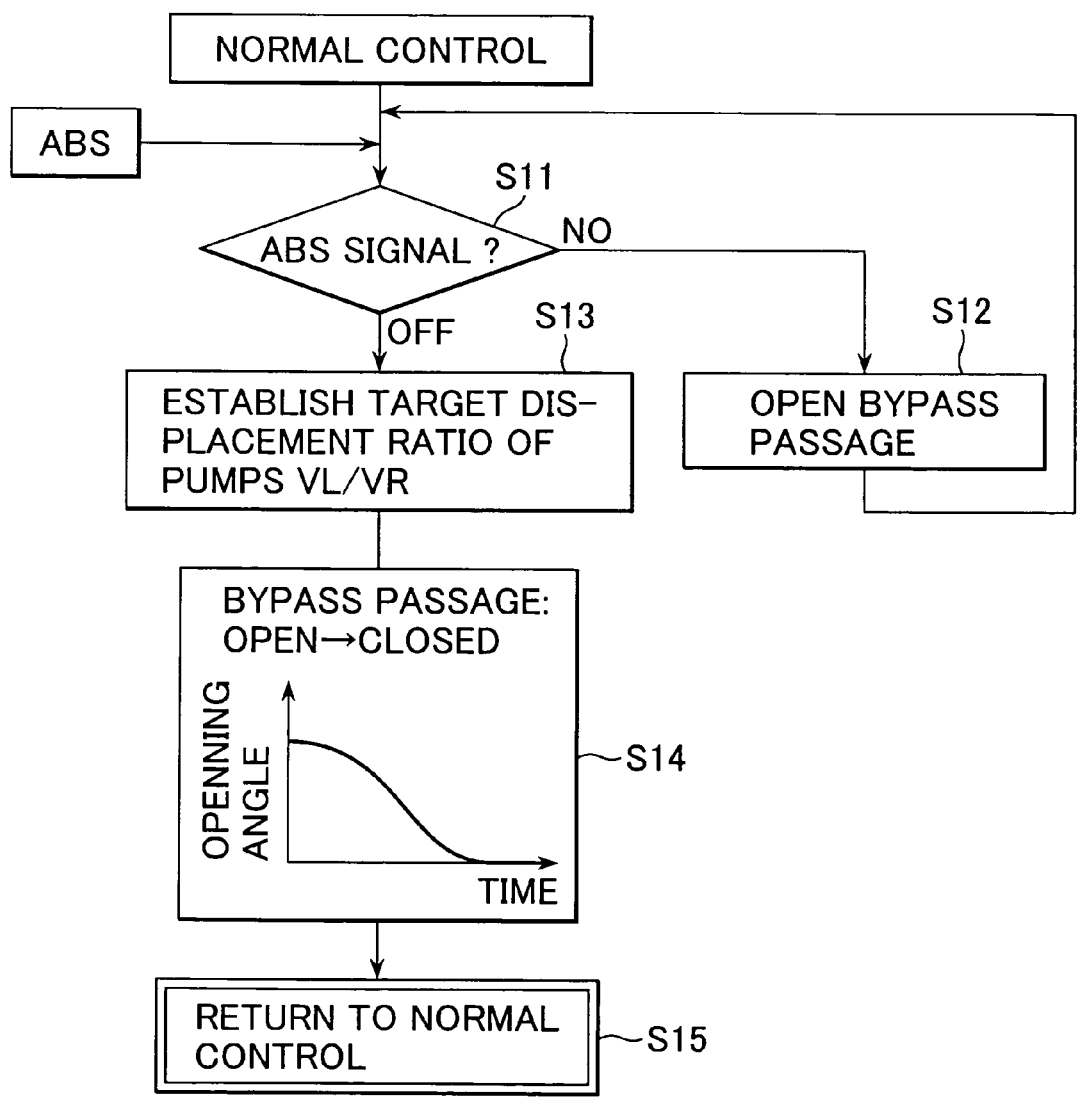
FIG. 13 is a flowchart showing processes of controlling the left and right hydraulic pumps by a controller according to a third embodiment.

Below, the control processes of the hydraulic pumps 3L, 3R by the controller 50 will be described using a flowchart of FIG. 13.

As described before, while the normal control is executed, the bypass passage 17 is closed by the opening and closing valve 18. The displacements of the respective pumps are controlled so that the rotation speed ratio agrees with the target value. In this state, when the ABS signal is outputted from the ABS control unit 51, the program goes to a step S1 where it is checked whether or not the ABS signal is outputted.

In case where the ABS signal is outputted, that is, the ABS is operative, the program goes from the step S11 to a step S12 where the controller 50 immediately opens the opening and closing valve 18 of the bypass passage 17 to set the rotation of the respective pumps free. As a result, the braking control of the ABS can be prevented from being disturbed. Then, the program returns to the step S11 where the ABS signal is continued to be watched in a state of the opening and closing valve 18 retained open.

After that, when the ABS signal ceases to be outputted, that is, when the ABS is inoperative, the program goes from the step S11 to a step S13 where the target displacement ratio VL/VR is established in order to obtain the desired rotation speed ratio between left and right wheels according to the driving conditions and at a step S14 the opening and closing valve 18 is closed gradually. For example, as shown in a graph of the step S4, the valve closing speed of the opening and closing valve 18 is relatively reduced when the valve is almost closed. As a result, the shock following the valve closing can be alleviated. After the opening and closing valve 18 is fully closed, the program goes to a step S15 where the program returns to the normal control.

Figure 14:
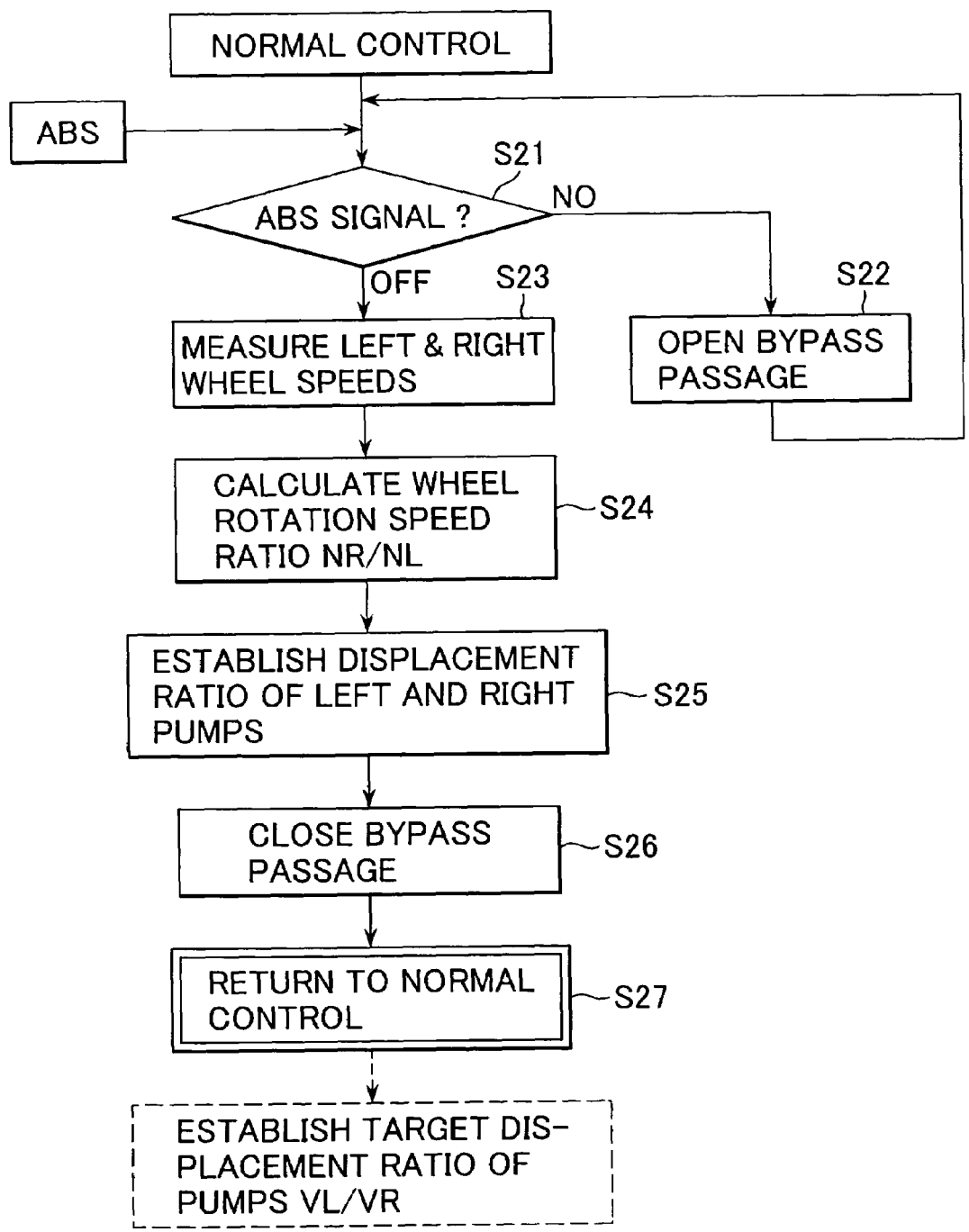
FIG. 14 is a flowchart showing processes of controlling the left and right hydraulic pumps by a controller according to a fourth embodiment.

Next, a fourth embodiment of the present invention will be described using a flowchart of FIG. 14.

According to the fourth embodiment, when the control of the hydraulic pumps returns to the normal control, the shock in closing the valve is alleviated by regulating the discharge amount of the left and right hydraulic pumps 3L, 3R so as to equalize before closing the opening and closing valve 18.

When the ABS signal is outputted during the normal control, in the same manner as the third embodiment, the program goes from a step S21 to a step S22 where the opening and closing valve 18 of the bypass passage 17 is immediately closed and returns to the step S21 where the ABS signal is continued to be checked.

After that, when the ABS signal stops, the program goes from the step S21 to a step S23 where the wheel speeds of the left and right wheels are measured and at a step S24 the rotation speed ratio between left and right wheels NR/NL is calculated. Next, the program goes to a step S25 where the displacement ratio between left and right hydraulic pumps 3L, 3R VL/VR is established so as to coincide with the calculated rotation speed ratio between left and right wheels NR/NL and the displacement of the respective pumps is adjusted with this displacement ratio VL/VR retained such that the amount of discharge of the left and right hydraulic pumps 3L, 3R coincides.

Then, at a step S26 the opening and closing valve 18 of the bypass passage 17 is closed and at a step S27 the rotation ratio control returns to the normal control. After returning to the normal control, the target displacement ratio between left and right hydraulic pumps 3L, 3R is established so that the rotation ratio between left and right wheels coincides with the target rotation ratio determined according to the driving conditions.

According to the fourth embodiment, when the ABS operation stops, since the amount of discharge of the respective left and right hydraulic pumps 3L, 3R is adjusted beforehand so as to become equal before closing the opening and closing valve 18, not only the shock in closing the valve can be alleviated, but also unnecessary yaw moment can be prevented from occurring and the vehicle behavior can be stabilized.

Next, a fifth embodiment of the present invention will be described by referring to a flowchart of FIG. 15.

It is an object of the fifth embodiment to alleviate the shock in closing the valve and to swiftly transfer to the normal control when the ABS is inoperative.

Figure 15:
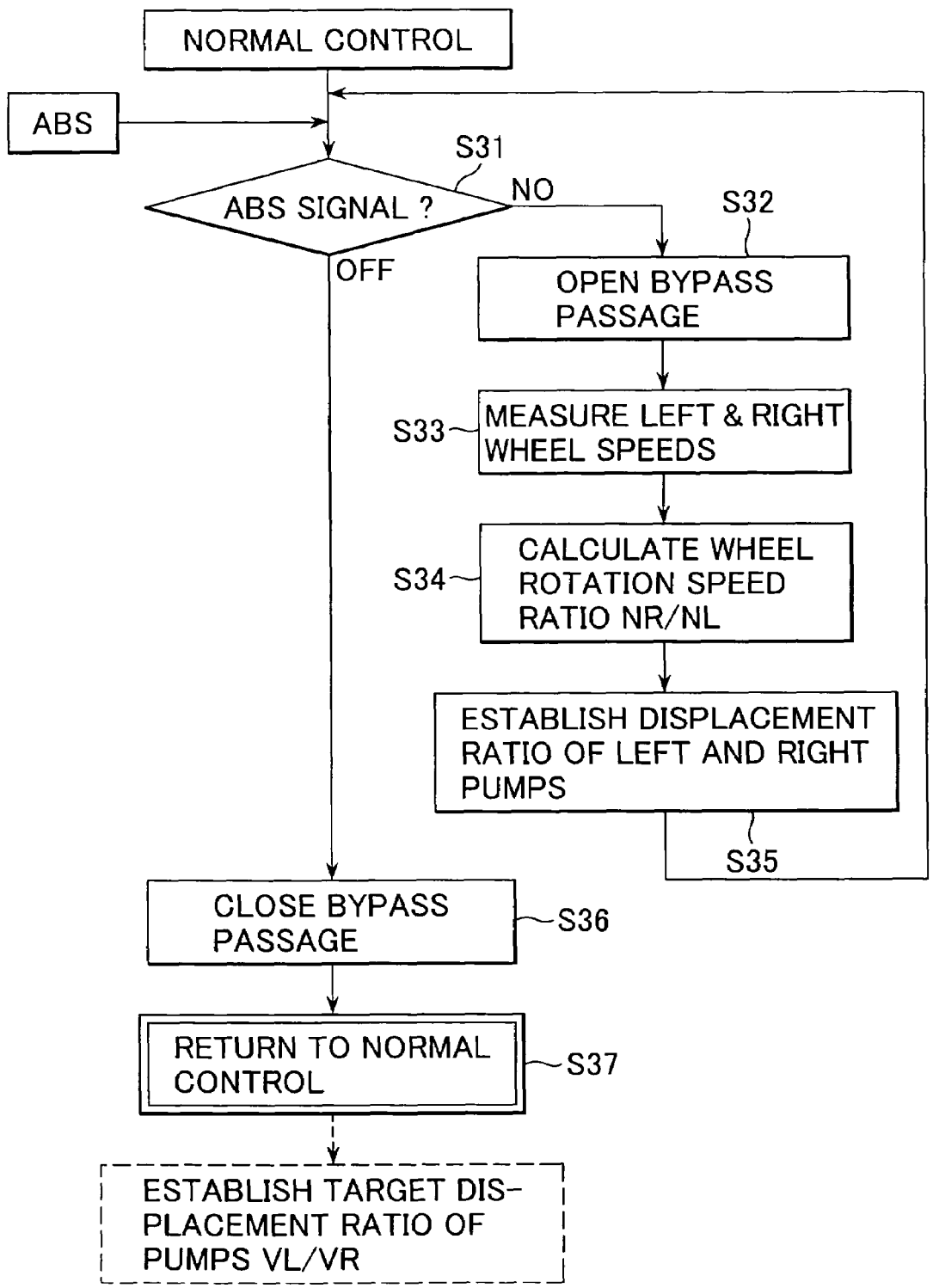
FIG. 15 is a flowchart showing processes of controlling the left and right hydraulic pumps by a controller according to a fifth embodiment.

According to the fifth embodiment, as shown in the flowchart of FIG. 15, when the ABS signal is outputted during the normal control, at a step S31 it is checked whether or not the ABS is operative. In case where the ABS is operative, the program goes from a step S31 to a step S32 where the opening and closing valve 18 of the bypass passage 17 is immediately opened and at a step S33 where the wheel speeds of the left and right wheels are measured based on signals from the wheel speed sensors.

Then, the program goes to a step S34 in which the rotation speed ratio between left and right wheels NR/NL is calculated and at a step S35 the displacement ratio between left and right hydraulic pumps 3L, 3R VL/VR is established so as to be equal to the calculated rotation speed ratio NR/NL. Further, the amount of discharge of the respective hydraulic pumps 3L, 3R is adjusted so as to be equal to each other while that displacement ratio VL/VR is retained, the program returning to the step S31 where the ABS signal is watched.

When the ABS signal stops, the program goes from the step S31 to a step S36 where the opening and closing valve 18 of the bypass passage 17 is immediately closed and at a step S37 the normal control is restored.

According to the fifth embodiment, since when the ABS is operative, the amount of discharge of the respective left and right hydraulic pumps 3L, 3R has been already adjusted to be equal to each other, even in case where the opening and closing valve 18 is suddenly closed, there occurs no shock in the bypass passage 17 and the normal control is immediately restored.

The entire contents of Japanese Patent Applications No. Tokugan 2002-376461 filed Dec. 26, 2002, No. Tokugan 2002-376462 filed Dec. 26, 2002 and No. Tokugan 2002-376463 filed Dec. 26, 2002, are incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A differential rotation control apparatus for a vehicle having a left axle shaft and a right axle shaft, comprising:
    a left hydraulic pump connected wit said left axle shaft;
    a right hydraulic pump connected with said right axle shaft;
    a first hydraulic passage for connecting a suction port of said left hydraulic pump with a discharge port of said right hydraulic pump;
    a second hydraulic passage for connecting a suction port of said right hydraulic pump with a discharge port of said left hydraulic pump; and
    variable displacement means for independently varying a displacement of each of said left and right hydraulic pumps so as to control a rotation speed ratio between said left and right axle shafts at a discretionary ratio, wherein at least one of said left hydraulic pump and said right hydraulic pump comprises a vane pump.

2. The differential rotation control apparatus according to 1, wherein said left hydraulic pump is connected with said left axle shaft through power transmitting means including at least one of gears and chains.

3. The differential rotation control apparatus according to claim 1, wherein said right hydraulic pump is connected with said right axle shaft through power transmitting means including at least one of gears and chains.

4. The apparatus of claim 1, wherein at least one of said left axle shaft and said right axle shaft is connected to a driven wheel.

5. A differential rotation control apparatus for a vehicle having a left axle shaft a right axle shaft, a differential including a left output shaft and a right output shaft for distributing a driving force from a power source to said left and right output shafts, comprising:
    a left hydraulic pump driveably provided between said left output shaft and said left axle shaft;
    a right hydraulic pump driveably provided between said right output shaft and said fight axle shaft;
    a first hydraulic passage for connecting a suction port of said left hydraulic pump with a discharge port of said right hydraulic pump;
    a second hydraulic passage for connecting a suction port of said fight hydraulic pump with a discharge port of said left hydraulic pump; and
    variable displacement means for independently varying a displacement of each of said left and right hydraulic pumps so as to equalize an actual rotation speed ratio between said left and right axle shafts to a rotation speed ratio between said left and right axle shafts determined based on a turning radius of said vehicle, wherein said turning radius is calculated from a steering angle.

6. The differential rotation control apparatus according to claim 5, wherein said left output shaft is connected with said left hydraulic pump through power transmitting means including at least one of gears and chains.

7. The differential rotation control apparatus according to claim 5, wherein said right output shaft is connected with said right hydraulic pump through power transmitting means including at least one of gears and chains.

8. A differential rotation control apparatus for a vehicle having a left axle shaft and a right axle shaft, comprising:
    a left hydraulic pump connected with said left axle shaft;
    a right hydraulic pump connected with said right axle shaft;
    a first hydraulic passage for connecting a suction port of said left hydraulic pump with a discharge port of said right hydraulic pump;
    a second hydraulic passage for connecting a suction port of said right hydraulic pump with a discharge port of said left hydraulic pump; and
    variable displacement means for independently varying a displacement of each of said left and right hydraulic pumps so as to control a rotation speed ratio between said left and right axle shafts at a discretionary ratio, wherein at least one of said first and second hydraulic passages is connected with a reserve tank through a relief passage having a valve for opening out of a predetermined pressure range.

9. A differential rotation control apparatus for a vehicle having a left axle shaft, a right axle shaft, a differential including a left output shaft and a right output shaft for distributing a driving force from a power source to said left and right output shafts, comprising:
    a left hydraulic pump driveably provided between said left output shaft and said left axle shaft;
    a right hydraulic pump driveably provided between said right output shaft and said right axle shaft;

a first hydraulic passage for connecting a suction port of said left hydraulic pump with a discharge port of said right hydraulic pump;
a second hydraulic passage for connecting a suction port of said right hydraulic pump with a discharge port of said left hydraulic pump; and
variable displacement means for independently varying a displacement of each of said left and right hydraulic pumps so as to equalize an actual rotation speed ratio between said left and right axle shafts to a rotation speed ratio between said left and right axle shafts determined based on a turning radius of said vehicle, wherein at least one of said first and second hydraulic passages is connected with a reserve tank through a relief passage having a valve for opening out of a predetermined pressure range.

10. A differential rotation control apparatus for a vehicle having an antilock braking system, a left axle shaft and a right axle shaft, comprising:
a left hydraulic pump connected with said left axle shaft;
a right hydraulic pump connected with said right axle shaft;
a first hydraulic passage for connecting a suction port of said left hydraulic pump with a discharge port of said right hydraulic pump;
a second hydraulic passage for connecting a suction port of said right hydraulic pump with a discharge port of said left hydraulic pump;
variable displacement means for varying a displacement of at least one of said left and right hydraulic pumps so as to control a rotation speed ratio between said left and right axle shafts at a discretionary ratio;
a bypass passage interposed between said first hydraulic passage and said second hydraulic passage; and
an opening and closing valve provided in said bypass passage for opening when said antilock braking system is operative and for closing when said antilock braking system is inoperative.

11. The differential rotation control apparatus according to claim 10, wherein said opening and closing valve is gradually closed when said antilock braking system is inoperative.

12. The differential rotation control apparatus according to claim 10, wherein said opening and closing valve is closed after the discharge amount of said left hydraulic pump agrees with that of said right hydraulic pump, when said antilock braking system is inoperative.

13. A differential rotation control apparatus for a vehicle having an antilock braking system, a left axle shaft, a right axle shaft, a differential including a left output shaft and a right output shaft for distributing a driving force from a power source to said left and right output shafts, comprising:
a left hydraulic pump driveably provided between said left output shaft and said left axle shaft;
a right hydraulic pump driveably provided between said right output shaft and said right axle shaft;
a first hydraulic passage for connecting a suction port of said left hydraulic pump with a discharge port of said right hydraulic pump;
a second hydraulic passage for connecting a suction port of said right hydraulic pump with a discharge port of said left hydraulic pump;
variable displacement means for varying a displacement of at least one of said left and right hydraulic pumps so as to equalize an actual rotation speed ratio between said left and right axle shafts to a rotation speed ratio between said left and right axle shafts determined based on a turning radius of said vehicle;
a bypass passage interposed between said first hydraulic passage and said second hydraulic passage; and
an opening and closing valve provided in said bypass passage for opening when said antilock braking system is operative and for closing when said antilock braking system is inoperative.

14. The differential rotation control apparatus according to claim 13, wherein said opening and closing valve is gradually closed when said antilock braking system is inoperative.

15. The differential rotation control apparatus according to claim 13, wherein said opening and closing valve is closed after the discharge amount of said left hydraulic pump agrees with that of said right hydraulic pump, when said antilock braking system is inoperative.

16. A differential rotation control apparatus for a vehicle having a left axle shaft and a right axle shaft, comprising:
a left hydraulic pump connected with said left axle shaft;
a right hydraulic pump connected with said right axle shaft;
a first hydraulic passage for connecting a suction port of said left hydraulic pump with a discharge port of said right hydraulic pump;
a second hydraulic passage for connecting a suction port of said right hydraulic pump with a discharge port of said left hydraulic pump; and
variable displacement means for independently varying a displacement of each of said left and right hydraulic pumps so as to control a rotation speed ratio between said left and right axle shafts at a discretionary ratio, wherein said left hydraulic pump comprises a left hydraulic pump actuator, and said right hydraulic pump comprises a right hydraulic pump actuator, and wherein said left hydraulic pump actuator operates to swing a cam ring about a supporting point to vary the displacement of said left hydraulic pump.

17. A differential rotation control apparatus for a vehicle having a left axle shaft and a right axle shaft, comprising:
a left hydraulic pump connected with said left axle shaft;
a right hydraulic pump connected with said right axle shaft;
a first hydraulic passage for connecting a suction port of said left hydraulic pump with a discharge port of said right hydraulic pump;
a second hydraulic passage for connecting a suction port of said right hydraulic pump with a discharge port of said left hydraulic pump; and
variable displacement means for independently varying a displacement of each of said left and right hydraulic pumps so as to control a rotation speed ratio between said left and right axle shafts at a discretionary ratio, wherein said left hydraulic pump comprises a left hydraulic pump actuator, and said right hydraulic pump comprises a right hydraulic pump actuator, and wherein said right hydraulic pump actuator operates to swing a cam ring about a supporting point to vary the displacement of said right hydraulic pump.

* * * * *